United States Patent [19]

Ishida et al.

[11] Patent Number: 5,397,498
[45] Date of Patent: Mar. 14, 1995

[54] METHOD FOR CLEANING MOLDING MACHINE IN WHICH RESIDUAL THERMOPLASTIC RESINS REMAIN AND CLEANING COMPOSITION THEREFOR

[75] Inventors: Yuzuru Ishida; Masahiro Mitsuboshi, both of Kanagawa; Ichirou Otsuka, Tokyo; Haruo Inoue, Kanagawa, all of Japan

[73] Assignee: Mitsui Toatsu Chemicals, Inc., Tokyo, Japan

[21] Appl. No.: 204,886

[22] Filed: Mar. 2, 1994

Related U.S. Application Data

[63] Continuation of Ser. No. 872,706, Dec. 24, 1991, abandoned.

[51] Int. Cl.⁶ .................. C11D 1/12; C11D 3/075; C11D 3/00
[52] U.S. Cl. .................. 252/174.23; 252/174.21; 252/531; 252/550; 252/DIG. C; 252/DIG. 14; 134/7; 134/8; 134/22.19
[58] Field of Search .................. 252/174.21, 174.23, 252/531, DIG. 2, DIG. 14, 550; 134/7, 8, 22.19

[56] References Cited

U.S. PATENT DOCUMENTS

| 4,554,099 | 11/1985 | Clarke | 252/551 |
| 4,838,945 | 6/1989 | Fuji et al. | 134/7 |
| 4,838,948 | 6/1989 | Bailey | 134/8 |
| 4,976,788 | 12/1990 | Nohr et al. | 134/5 |
| 5,108,645 | 4/1992 | Obama | 252/174.23 |

FOREIGN PATENT DOCUMENTS

| 2061827 | 6/1972 | Germany | 252/174.23 |
| 5141004 | 4/1974 | Japan | 252/174.23 |
| 58-149998 | 9/1983 | Japan . | |
| 59-124999 | 7/1984 | Japan | 252/174.23 |
| 60-139411 | 7/1985 | Japan . | |
| 374499 | 8/1985 | Japan | 252/174.23 |
| 61-235500 | 10/1986 | Japan . | |
| 59126440 | 7/1987 | Japan | 252/174.23 |
| 62-195045 | 8/1987 | Japan . | |
| 2163144 | 12/1988 | Japan . | |
| 2-308899 | 12/1990 | Japan . | |

OTHER PUBLICATIONS

WPIL, Week 31, AN 90-23578 & JP-A-163 144 (Mitsui Toatsu) 22 Jun. 1990.
WPIL, Week 22, AN 90-169291 & JP-A-2 112 178 (Sumitomo Denso) 24 Apr. 1990.
Patent Abs. of Japan, vol. 013, No. 156 & JP-A-63 312 347 (Toray) 20 Dec. 1988.
Patent Abs. of Japan, vol. 015, No. 238 & JP-A-03 074 499 (Tokyo Ink) 29 Mar. 91.

Primary Examiner—Paul Lieberman
Assistant Examiner—Kery Fries
Attorney, Agent, or Firm—Burns, Doane, Swecker & Mathis

[57] ABSTRACT

A method for cleaning the interior of a molding machine having a residual thermoplastic resin after molding comprises the step of cleaning the interior of a molding machine with a cleaning composition which comprises:

(A) 100 parts by weight of a thermoplastic resin;
(B) 2 to 100 parts by weight of a polyalkylene oxide glycol having a viscosity-average molecular weight ranging from 10,000 to 1,500,000; and
(C) 0.5 to 5 parts by weight, per 100 parts by weight of the sum of the foregoing components (A) and (B), of an alkylsulfate represented by the following general formula (I):

$$R_1-O-SO_3M \qquad (I)$$

wherein $R_1$ represents an alkyl group having 8 to 20 carbon atoms and M represents an ion selected from the group consisting of K, Na and $NH_4$ or a fatty acid salt represented by the following general formula (II):

$$R_2COOX \qquad (II)$$

wherein $R_2$ represents an alkyl group having 7 to 23 carbon atoms and X represents an ion selected from the group consisting of K, Na, Ca, Mg and Zn.

The cleaning method exhibits excellent properties of cleaning molding machines and makes it possible to perform rapid exchange of colors and/or kinds of resins within a single molding machine.

6 Claims, No Drawings

METHOD FOR CLEANING MOLDING MACHINE IN WHICH RESIDUAL THERMOPLASTIC RESINS REMAIN AND CLEANING COMPOSITION THEREFOR

This application is a continuation of application Ser. No. 07/872,706, filed Dec. 24, 1991, now abandoned.

BACKGROUND OF THE INVENTION

1. Field of the Invention

The present invention relates to a method for cleaning the interior of a molding machine including a residual thermoplastic resin after molding the same as well as a cleaning composition for cleaning the molding machine and more specifically, to a method for cleaning the interior of a molding machine in which a resin remains after a molding operation, which makes it possible to immediately change the kinds and colors of resins within a single molding machine and to improve the quality of products and production efficiency.

2. Prior Art

General purpose thermoplastic resins such as styrenic resins and olefinic resins as well as engineering plastics have widely been used in various fields because of their excellent physical properties. These thermoplastic resins have been variously colored and formed into a variety of shapes by manufacturers and processors. The manufacturers and processors have frequently changed the kinds and colors of resin in a single molding machine in accordance with the recent diversity in market needs. Such changes in the kinds and colors of resin result in a waste of time and materials and correspondingly, there has been desired the development of a method for effective cleaning of the interior of a molding machine in order to improve production efficiency and quality of the resulting products.

Under such circumstances, there have already been proposed some cleaning agents. For instance, Japanese Unexamined Patent Publication (hereinafter referred to as "J. P. KOKAI") No. Hei 2-308899 discloses a cleaning agent comprising a thermoplastic resin in which 0.5 to 25% by weight of water is incorporated. Further, J. P. KOKAI Nos. Sho 58-149998, Sho 59-124999 and Sho 60-139411 propose cleaning agents comprising inorganic fillers.

These cleaning agents are effective for the removal of resins remaining in a molding machine, but the cleaning agents per se are liable to remain in the machine, correspondingly a great deal of time and a large amount of materials are required for substituting an intended resin for the cleaning agents and thus these cleaning agents are insufficient for achieving the foregoing purposes. Moreover, they are effective only for specific thermoplastic resins and do not have universality in the cleaning effect. In other words, they are limited in their applications.

In addition, there have been proposed cleaning agents which comprise thermoplastic resins and surfactants in J. P. KOKAI Nos. Sho 62-195045 and Hei 3-74499 and a cleaning agent which comprises a styrenic resin and a polyalkylene oxide glycol in J. P. KOKAI No. Hei 2-163144.

These cleaning agents can solve the foregoing problem of limited applications, but still suffer from the problem that the cleaning agents per se remain in the interior of molding machines.

SUMMARY OF THE INVENTION

Accordingly, an object of the present invention is to provide a method for cleaning the interior of a molding machine in which a resin remains even after molding, which permits rapid exchange of the kinds or colors of resin within a single molding machine and which permits the improvement in production efficiency and quality of the resulting molded products.

Another object of the present invention is to provide a cleaning composition for use in cleaning of the interior of a molding machine having a residual resin after molding, which does not remain in the interior of the molding machine after the cleaning operation, in other words which has the ability of being discharged out of the machine and which can extend the scope of resins to be cleaned, i.e., the possibility of applications.

According to the present invention, there is provided a method for cleaning the interior of a molding machine having a residual thermoplastic resin after molding comprising the step of cleaning the interior of the molding machine with a cleaning composition which comprises:

(A) 100 parts by weight of a thermoplastic resin;
(B) 2 to 100 parts by weight of a polyalkylene oxide glycol having a viscosity-average molecular weight ranging from 10,000 to 1,500,000; and
(C) 0.5 to 5 parts by weight, per 100 parts by weight of the sum of the foregoing components (A) and (B), of an alkylsulfate represented by the following general formula (I):

$$R_1-O-SO_3M \qquad (I)$$

wherein $R_1$ represents an alkyl group having 8 to 20 carbon atoms and M represents an ion selected from the group consisting of K, Na and $NH_4$ and/or a fatty acid salt represented by the following general formula (II):

$$R_2COOX \qquad (II)$$

wherein $R_2$ represents an alkyl group having 7 to 23 carbon atoms and X represents an ion selected from the group consisting of K, Na, Ca, Mg and Zn.

DETAILED EXPLANATION OF THE INVENTION

The term "molding machine(s)" is used, in the present invention, in its broad meanings including injection molding machines, extruders, blow molding machines, sheet extruders, pipe extruders, foam molding machines, inflation molding machines and other machines for molding or processing resins.

Typical examples of thermoplastic resins used in the present invention as Component (A) include styrenic resins such as polystyrene, ABS resins, AS resins and maleic anhydride-styrene copolymeric resins; olefinic resins such as polyethylene, polypropylene and polybutene; polyvinyl chlorides, polyamides, polycarbonates, polyacetals and polyesters, but most preferred are styrenic resins and olefinic resins among others because they are relatively cheap.

Properties of these thermoplastic resins such as viscosity and molecular weight are not restricted to specific values and those commercially available can be used as such.

In addition, these thermoplastic resins may be used alone or in any combination.

Examples of polyalkylene oxide glycols used as Component (B) include polyethylene oxide glycol, polypropylene oxide glycol, polytetramethylene oxide glycol, polyhexamethylene oxide glycol, block and random copolymers of ethylene oxide and propylene oxide and block and random copolymers of ethylene oxide and tetrahydrofuran. Polyethylene oxide glycol is most preferably used in the present invention.

The viscosity-average molecular weight of the polyalkylene oxide glycol preferably ranges from 10,000 to 1,500,000. This is because if the viscosity-average molecular weight thereof is less than 10,000, the melt viscosity of the resulting composition is markedly reduced, the composition accordingly remains in extruders or molding machines even after cleaning and the difference in viscosity between the compound and the thermoplastic resin to be removed from the apparatus becomes too high to achieve a desired cleaning effect of the cleaning composition. On the other hand, if the viscosity-average molecular weight of the compound exceeds 1,500,000, the compound causes gelation by the action of heat and does not exhibit any desired cleaning effect. The "viscosity-average molecular weight" herein used is defined as follows. The ratio of viscosity, ($\eta_0$) of pure water to that ($\eta$) of an aqueous solution of an alkylene oxide glycol (each being determined at 30° C.) is herein defined to be relative viscosity ($\eta_{rel}=\eta/\eta_0$). Specific viscosity ($\eta_{sp}$) is obtained from the relative viscosity and written in the following form:

$$\eta_{sp}=\eta_{rel}-1$$

Then the specific viscosity ($\eta_{sp}$) is divided by the concentration of the aqueous solution of the polyalkylene oxide glycol (C; g/100 ml) to give reduced viscosity ($\eta_{red}=\eta_{sp}/C$). Furthermore, intrinsic viscosity ([$\eta$]) is determined by the extrapolation of reduced viscosities ($\eta_{red}$) at various concentrations (C) to the infinitely diluted solution (C=0) and the viscosity-average molecular weight ($M_v$) is calculated from the following formula concerning the intrinsic viscosity:

$$[\eta]=1.25\times 10^{-4}M_v^{0.78}$$

The amount of the polyalkylene oxide glycol as Component (B) ranges from 2 to 100 parts by weight and preferably 7 to 80 parts by weight per 100 parts by weight of the thermoplastic resin. If the amount thereof is less than 2 parts by weight, any desired cleaning effect cannot be achieved. On the other hand, if it exceeds 100 parts by weight, the polyalkylene oxide glycol is decomposed by the action of heat, correspondingly makes the interior of extruders and molding machines dirty and thus any desired cleaning effect cannot be anticipated.

The alkylsulfates used in the invention as Component (C) are, for instance, $C_8$ to $C_{20}$ alkyl sulfates of K, Na and $NH_4$ and typical examples thereof include sodium octylsulfate, sodium ethylhexylsulfate, sodium undecylsulfate, sodium dodecylsulfate, potassium dodecylsulfate, ammonium dodecylsulfate, sodium hexadecylsulfate and ammonium octadecylsulfate. These alkylsulfates can be used alone or in any combination.

Moreover, the fatty acid salts used herein as Component (C) are, for instance, K, Na, Ca, Mg and Zn salts of fatty acids having $C_7$ to $C_{23}$ alkyl groups and typical examples thereof are caprylic acid, capric acid, lauric acid, myristic acid, palmitic acid, stearic acid, behenic acid and lignoceric acid. These fatty acid salts may be used alone or in any combination. Moreover, the alkylsulfates and the fatty acid salts may be used in combination.

The amount of the alkylsulfate and/or fatty acid salt ranges from 0.5 to 5 parts by weight per 100 parts by weight of the sum of the foregoing thermoplastic resin and the polyalkylene oxide glycol. If the amount of the alkylsulfate and/or fatty acid salt used is less than 0.5 part by weight, the resulting cleaning agent has low ability of being discharged out of processing and molding machines and is liable to remain in the machines. On the other hand, it exceeds 5 parts by weight, the resulting cleaning composition has only an insufficient cleaning effect.

Methods for the preparation of the cleaning composition according to the present invention are not restricted to specific ones, but in general it can be prepared by a method comprising melting and mixing the components, i.e., a thermoplastic resin, a polyalkylene oxide glycol and an alkylsulfate and/or a fatty acid salt in a kneader such as a monoaxial or biaxial extruder.

The cleaning method according to the present invention comprises supplying the cleaning composition thus prepared to a molding machine and cleaning the machine to remove a thermoplastic resin remaining therein at a temperature at which the cleaning composition is plasticized while rotating the screw of the machine. The conditions for cleaning are not critical as long as the cleaning agent and the residual thermoplastic resin can be discharged through an outlet port of the machine. Surprisingly, the cleaning composition of the present invention has an ability of self-discharge, i.e., the cleaning agent per se can be discharged out of the machine without being compulsorily discharged with an intended resin to be replaced or subsequently molded. More specifically, the cleaning composition can be discharged through a nozzle only by the rotational operation of a screw of, for instance, a molding machine and there is not observed any residual resin in the machine. This would not be anticipated by the use of any conventional cleaning composition.

Alternatively, it is also possible to add desired amounts of a polyalkylene oxide glycol and an alkylsulfate and/or a fatty acid salt to the resin remaining in the machine to be replaced for preparing a cleaning composition in situ or to supply, to a molding machine, a detergent composition prepared by mixing Components (B) and (C) with a resin to be replaced or subsequently processed.

The cleaning composition of the present invention can be used in the removal of all kinds of thermoplastic resins from molding and processing machines and specific examples thereof include styrenic resins such as polystyrenes, ABS resins, AS resins and maleic anhydride-styrene copolymeric resins; polyolefinic resins such as polyethylenes and polypropylenes; general purpose resins such as poly(methyl methacrylates) and polyvinyl chlorides; and engineering resins such as polyamides, polycarbonates, polyacetals and polyesters.

The present invention will hereinafter be explained in more detail with reference to the following non-limitative working Examples and Comparative Examples.

Pellets colored black for use in confirming the cleaning effect of cleaning agents were prepared in the following manner. To a styrenic resin (Suntak ST-42;

available from Mitsui Toatsu Chemicals, Inc.), there was added carbon black in an amount of 1.5% by weight on the basis of the weight of the styrenic resin, followed by mixing in a tumbling mixer, melting and mixing these ingredients in a biaxial extruder "AS-30" (available from Nakaya Co., Ltd.) and pelletization to give pellets that were colored black.

The test for cleaning effect of cleaning agents was performed in the following manner.

Cleaning Test of Injection Molding Machine

The black-colored pellets obtained above were subjected to repeated injection molding at a cylinder temperature of 220° C. with an injection molding machine "JSW 100EP" (available from The Japan Steel Works, Ltd.),to thus contaminate the interior of the molding machine with the black-colored resin.

Thereafter, the cleaning composition of the present invention was formed into square plates having a size of 40×40×2.5 mm (thickness) using the foregoing molding machine, the color of the resulting square plates was visually judged to determine the number of shots, i.e., the number of square plates required for completely exchanging the color of the interior of the machine with the cleaning composition and the cleaning effect was evaluated in terms of the shot number.

The test for the residual amount (self-discharge ability) of the cleaning agent per se was performed in the following method.

Test for Self-Discharge Ability by Pulling Out Screw

After the color was completely changed in the foregoing "Cleaning Test of Injection Molding Machine", the supply of the cleaning agent was interrupted and the cleaning agent was discharged through a nozzle of the molding machine at a cylinder temperature of 220° C. while rotating a screw at 100 rpm. After the discharge was continued for 2 minutes, the rotation of the screw was interrupted and the screw was pulled out. The amount of the cleaning agent remaining on the screw and cylinder was determined to evaluate the self-discharge ability of the cleaning agent.

EXAMPLE 1

A cleaning agent was prepared by premixing 100 parts by weight of a resin mixture which comprises 100 parts by weight of a styrenic resin ("SANTAC ST-42"; available from Mitsui Toatsu Chemicals, Inc.) as a thermoplastic resin and 15 parts by weight of polyethylene oxide glycol having a viscosity-average molecular weight of 200,000 (ALKOX R-400; available from Meisei Chemical Industries, Ltd.) as a polyalkylene oxide glycol; and 3 parts by weight of sodium n-dodecylsulfate (Kanto Chemical Co., Ltd.) as an alkylsulfate in a tumbling mixer, and melting and mixing the mixture at an extrusion temperature of 200° C. with a biaxial extruder "AS-30" (available from Nakatani Co., Ltd.) to give pellets of the mixture.

The resulting cleaning agent was subjected to the foregoing cleaning test of injection molding machine and test for self-discharge ability by pulling out the screw and the results obtained were summarized in the following Table 1.

EXAMPLES 2 to 9, 13 to 15 and Comparative Examples 1 to 9

Cleaning agents were prepared in the same manner used in Example 1 except that the kinds of thermoplastic resins, the contents and viscosity-average molecular weights of polyalkylene oxide glycols, and the kinds and contents of surfactants used were changed to those listed in Table 1 and subjected to the same tests (except that the cylinder temperature used in Example 15 was 260° C. and that only the cleaning effect was determined in Comparative Example 8). The results thus obtained are listed in the following Table 1.

EXAMPLES 10 to 12

Cleaning agents were prepared in the same manner used in Example 1 except that black-colored pellets (the resins to be cleaned with the cleaning agents) for use in confirming the cleaning effect were substituted for that used in Example 1 and subjected to the same tests (except that the cylinder temperature used in Example 12 was 260° C.). The results thus obtained are listed in the following Table 1.

The thermoplastic resins used in the foregoing Examples were as follows:

Kinds of Thermoplastic Resins

| | |
|---|---|
| S: | ABS resin, SANTAC ST-42, available from Mitsui Toatsu Chemicals, Inc. |
| PP: | Polypropylene, "NOBLEN JH-G", available from Mitsui Toatsu Chemicals, Inc. |
| PMMA: | Poly(methyl methacrylate), PARAPET G, available from Kuraray Co., Ltd. |
| PA: | Polyamide, "Daiamide L1600", available from Daicel Hules Co., Ltd. |

There were used polyethylene oxide glycols having the following viscosity-average molecular weights, as the polyalkylene oxide glycol:

Viscosity-average molecular weight: 3,000
  Nissan Polyethylene Glycol "#4000", available from Nippon Oil and Fats Co., Ltd.
Viscosity-average molecular weight: 10,000
  Nissan Polyethylene Glycol "#11000", available from Nippon Oil and Fats Co., Ltd.
Viscosity-average molecular weight: 1,200,000
  ALKOX E-60, available from Meisei Chemical Industries, Ltd.
Viscosity-average molecular weight: 2,000,000
  ALKOX E-75, available from Meisei Chemical Industries, Ltd.

The following surfactants were employed:
Kinds of Surfactants Used
n-DS: sodium n-dodecylsulfate, available from Kanto Chemical Co., Ltd.
SNA: sodium stearate, available from Kanto Chemical Co., Ltd.

TABLE 1

| | | Example No. | | | | | | | | |
|---|---|---|---|---|---|---|---|---|---|---|
| | | 1 | 2 | 3 | 4 | 5 | 6 | 7 | 8 | 9 |
| Thermoplastic Resin | Kind | S | S | S | S | S | S | S | S | S |
| | Content [A] (part by weight) | 100 | 100 | 100 | 100 | 100 | 100 | 100 | 100 | 100 |
| Polyalkylene oxide glycol | Viscosity-average Molecular weight | $2 \times 10^5$ | $10^4$ | $12 \times 10^5$ | $2 \times 10^5$ | $2 \times 10^5$ | $2 \times 10^5$ | $2 \times 10^5$ | $2 \times 10^5$ | $2 \times 10^5$ |
| | Content [B] | 15 | 15 | 15 | 5 | 80 | 15 | 15 | 15 | 15 |

TABLE 1-continued

|  |  | | | | | | | | | |
|---|---|---|---|---|---|---|---|---|---|---|
| Surfactant | Kind | n-DS | n-DS | n-DS | n-DS | n-DS | SNA | SNA | n-DS | n-DS |
|  | Content [C]* part by weight | 3 | 3 | 3 | 3 | 3 | 3 | 1 | 1 | 4 |
| Resin to be Cleaned (Thermoplastic Resin Remaining in Apparatus) |  | S | S | S | S | S | S | S | S | S |
| Cleaning Effect (Number of Shots) |  | 3 | 6 | 6 | 8 | 9 | 4 | 10 | 8 | 9 |
| Self-Discharge Ability (9) |  | 0.5 | 0.8 | 0.8 | 1.9 | 0.7 | 0.6 | 1.6 | 1.8 | 0.6 |

|  |  | Example No. | | | | | |
|---|---|---|---|---|---|---|---|
|  |  | 10 | 11 | 12 | 13 | 14 | 15 |
| Thermoplastic Resin | Kind | S | S | S | PP | PMMA | PA |
|  | Content [A] (part by weight) | 100 | 100 | 100 | 100 | 100 | 100 |
| Polyalkylene oxide glycol | Viscosity-average | $2 \times 10^5$ | $2 \times 10^5$ | $2 \times 10^5$ | $2 \times 10^5$ | $2 \times 10^5$ | $2 \times 10^5$ |
|  | Content [B] (part by weight) | 15 | 15 | 15 | 15 | 15 | 15 |
| Surfactant | Kind | n-DS | n-DS | n-DS | n-DS | n-DS | n-DS |
|  | Content [C]* part by weight | 3 | 3 | 3 | 3 | 3 | 3 |
| Resin to be Cleaned (Thermoplastic Resin Remaining in Apparatus) |  | PP | PMMA | PA | S | S | S |
| Cleaning Effect (Number of shots) |  | 3 | 4 | 4 | 5 | 4 | 8 |
| Self-Discharge Ability |  | 0.5 | 0.5 | 0.5 | 0.7 | 0.9 | 1.1 |

|  |  | Example No. | | | | | | | | |
|---|---|---|---|---|---|---|---|---|---|---|
|  |  | 1 | 2 | 3 | 4 | 5 | 6 | 7 | 8 | 9 |
| Thermoplastic Resin | Kind | S | S | S | S | S | S | S | S | S |
|  | Content [A] (part by weight) | 100 | 100 | 100 | 100 | 100 | 100 | 100 | 100 | 100 |
| Polyalkylene oxide glycol | Viscosity-average Molecular weight | $3 \times 10^3$ | $2 \times 10^6$ | — | $2 \times 10^5$ | $2 \times 10^5$ | $2 \times 10^5$ | $2 \times 10^5$ | — | $2 \times 10^5$ |
|  | Content [B] (part by weight) | 15 | 15 | 0 | 1 | 120 | 15 | 15 | 0 | 15 |
| Surfactant | Kind | n-DS | n-DS | n-DS | n-DS | n-DS | n-DS | n-DS | — | SNA |
|  | Content [C]* part by weight | 3 | 3 | 3 | 3 | 3 | 0.2 | 8 | 0 | 0.2 |
| Resin to be Cleaned (Thermoplastic Resin Remaining in Apparatus) |  | S | S | S | S | S | S | S | S | S |
| Cleaning Effect (Number of Shots) |  | 25 | 23 | 48 | 31 | 25 | 11 | 28 | 73 | 12 |
| Self-Discharge Ability |  | 3.7 | 2.3 | 35.7 | 7.5 | 2.1 | 24.4 | 2.0 | — | 31.0 |

*This represents the content of a surfactant per 100 parts by weight of the sum of Component [A] and [B]

As seen from the results listed in Table 1, the cleaning method according to the present invention can provide an excellent cleaning effect for molding machines, makes it possible to easily exchange the resin previously used for molding into an intended resin to be subsequently molded and to change colors and kinds of resins within a short time period and with a small amount of a material.

We claim:

1. A method for cleaning the interior of a molding machine having a residual thermoplastic resin after molding, comprising the step of cleaning the interior of a molding machine with a cleaning composition which comprises:

(A) 100 parts by weight of a thermoplastic resin;
(B) 2 to 100 parts by weight of a polyalkylene oxide glycol having a viscosity-average molecular weight ranging from 10,000 to 1,500,000; and
(C) 0.5 to 5 parts by weight, per 100 parts by weight of the sum of the foregoing components (A) and (B), of at least one of an alkylsulfate represented by the following general formula (I):

$$R_1-O-SO_3M \qquad (I)$$

wherein $R_1$ represents an alkyl group having 8 to 20 carbon atoms and M represents an ion selected from the group consisting of K, Na and $NH_4$ and a fatty acid salt represented by the following general formula (II):

$$R_2COOX \qquad (II)$$

wherein $R_2$ represents an alkyl group having 7 to 23 carbon atoms and X represents an ion selected from the group consisting of K, Na, Ca, Mg and Zn.

2. The method of claim 1 which comprises cleaning the interior of the molding machine at a temperature for plasticizing the cleaning composition while rotating a screw of the machine to discharge the residual thermoplastic resin remaining in the machine through an outlet port of the machine.

3. The method of claim 1 wherein after the cleaning of the interior of the molding machine with the cleaning composition, the cleaning composition is discharged through an outlet port of the machine by rotating a screw of the machine.

4. The method of claim 1 wherein after molding components (B) and (C) are added to the thermoplastic resin remaining in the molding machine to prepare a cleaning composition in situ.

5. The method of claim 1 wherein a cleaning composition is prepared by adding components (B) and (C) to a thermoplastic resin used in the subsequent molding operation and the resulting cleaning composition is supplied to the molding machine to clean the machine.

6. A cleaning composition for cleaning the interior of a molding machine in which a resin remains after molding operation comprising:

(A) 100 parts by weight of a thermoplastic resin;

(B) 2 to 100 parts by weight of a polyalkylene oxide glycol having a viscosity-average molecular weight ranging from 10,000 to 1,500,000; and (C) 0.5 to 5 parts by weight, per 100 parts by weight of the sum of the foregoing components (A) and (B), of at least one of an alkylsulfate represented by the following general formula (I):

$$R_1\text{—}O\text{—}SO_3M \qquad (I)$$

wherein $R_1$ represents an alkyl group having 8 to 20 carbon atoms and M represents an ion selected from the group consisting of K, Na and $NH_4$ and a fatty acid salt represented by the following general formula (II):

$$R_2COOX \qquad (II)$$

wherein $R_2$ represents an alkyl group having 7 to 23 carbon atoms and X represents an ion selected from the group consisting of K, Na, Ca, Mg and Zn.

* * * * *

UNITED STATES PATENT AND TRADEMARK OFFICE
CERTIFICATE OF CORRECTION

PATENT NO. : 5,397,498
DATED : March 14, 1995
INVENTOR(S) : Yuzuru ISHIDA et al

It is certified that error appears in the above-indentified patent and that said Letters Patent is hereby corrected as shown below:

ON THE TITLE PAGE:
In Section 56, line 10, delete "5141004 4/1974" and insert therefor --51-41004 6/1976--;

line 14, delete "374499 8/1985" and insert therefor -- 3-74499 3/1991 --;

line 16, delete "59126440 7/1987" and insert therefor -- 59-126440 7/1984 --;

line 18, delete "2163144 12/1988" and insert therefor -- 2-163144 6/1990; and after line 19, add therefor -- 63-316213 12/1988 Japan --.

In Section entitled "OTHER PUBLICATIONS", line 2, delete "AN 90-23578" and insert therefor -- AN 90-235378 --.

In column 3, line 29, delete "$\eta rel = /\eta o$" and insert therefor --$\eta rel = \eta/\eta o$--.

In column 5, line 6, delete "Nakava" and insert therefor --Nakatani--.

In columns 7 and 8, Table 1, line 10 (entitled "Self-Discharge Ability) after "Self Discharge Ability" delete "(9)" and insert therefor --(g)*--.

UNITED STATES PATENT AND TRADEMARK OFFICE
CERTIFICATE OF CORRECTION

PATENT NO. : 5,397,498

DATED : March 14, 1995

INVENTOR(S) : Yuzuru ISHIDA et al

It is certified that error appears in the above-indentified patent and that said Letters Patent is hereby corrected as shown below:

In columns 7 and 8, Table 1, at the end of the each chart of examples (i.e, Examples 1-15 and Examples 1-9), delete "Self Discharge Ability" and insert "Self Discharge Ability (g)*--.

Signed and Sealed this

Third Day of September, 1996

Attest:

BRUCE LEHMAN

Attesting Officer

Commissioner of Patents and Trademarks